US008150308B2

United States Patent
Murray et al.

(10) Patent No.: US 8,150,308 B2
(45) Date of Patent: *Apr. 3, 2012

(54) INTRA-PREMISES WIRELESS BROADBAND SERVICE USING LUMPED AND DISTRIBUTED WIRELESS RADIATION FROM CABLE SOURCE INPUT

(75) Inventors: John F. Murray, Denville, NJ (US); Christopher W. Rice, Parsippany, NJ (US); Harry R. Worstell, Florham Park, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/958,268

(22) Filed: Dec. 1, 2010

(65) Prior Publication Data
US 2011/0069646 A1 Mar. 24, 2011

Related U.S. Application Data

(63) Continuation of application No. 12/647,585, filed on Dec. 28, 2009, now Pat. No. 7,865,134, and a continuation of application No. 11/934,938, filed on Nov. 5, 2007, now Pat. No. 7,697,887, and a continuation of application No. 10/730,577, filed on Dec. 8, 2003, now Pat. No. 7,369,838, and a continuation of application No. 09/678,522, filed on Oct. 3, 2000, now Pat. No. 6,751,441.

(51) Int. Cl.
*H04H 1/00* (2006.01)

(52) U.S. Cl. .................. 455/3.01; 455/3.05; 455/422.1; 725/135; 375/222

(58) Field of Classification Search .................. 455/3.01, 455/3.05, 422.1; 375/222; 725/135, 78
See application file for complete search history.

(56) References Cited

U.S. PATENT DOCUMENTS

| | | | | |
|---|---|---|---|---|
| 5,613,190 A * | 3/1997 | Hylton | ...................... | 725/81 |
| 6,377,782 B1 * | 4/2002 | Bishop et al. | ................ | 455/3.01 |
| 6,594,305 B1 * | 7/2003 | Roeck et al. | .................. | 375/222 |
| 6,822,972 B1 * | 11/2004 | Farhan | .......................... | 370/487 |
| 6,848,116 B1 * | 1/2005 | Land | .............................. | 725/78 |

* cited by examiner

*Primary Examiner* — Danh Le
(74) *Attorney, Agent, or Firm* — Guntin Meles & Gust, PLC; Andrew Gust

(57) ABSTRACT

A system that incorporates teachings of the present disclosure may include, for example, an apparatus that includes a communication interface for receiving broadband signals and for transmitting RF frequency signals to a diplexer located within a premises via cabling where the RF frequency signals are configured for distribution to signal radiation devices of the premises via the diplexer and where the RF frequency signals are configured for being radiated by the signal radiation devices to at least one wireless device; and a controller for generating packetized signals from the received broadband signals at a first frequency and for modulating the packetized signals at a second frequency, wherein the RF frequency signals comprise the modulated packetized signals at the second frequency. Additional embodiments are disclosed.

20 Claims, 2 Drawing Sheets

INTRA-PREMISES WIRELESS BROADBAND SERVICE USING LUMPED AND DISTRIBUTED WIRELESS RADIATION FROM CABLE SOURCE INPUT

CROSS-REFERENCE TO RELATED APPLICATIONS

This application is a continuation of, claims priority to, and incorporates herein by reference in its entirety pending U.S. patent application Ser. No. 12/647,585, filed Dec. 28, 2009; which is a continuation of, claims priority to, and incorporates herein by reference in its entirety U.S. patent application 11/934,938 (now U.S. Pat. No. 7,697,887), filed Nov. 5, 2007; which is a continuation of, claims priority to, and incorporates herein by reference in its entirety U.S. patent application Ser. No. 10/730,577 (now U.S. Pat. No. 7,369,838), filed Dec. 8, 2003; which is a continuation of, claims priority to, and incorporates herein by reference in its entirety, U.S. patent application Ser. No. 09/678,522 (now U.S. Pat. No. 6,751,441), filed Oct. 3, 2000.

FIELD OF THE DISCLOSURE

This invention relates to provision of broadband services within premises supplied with cable service such as a small office or a residence. It is specifically concerned with wireless distribution of these broadband services within the premises. A particular variant of this distribution system concerns the use of existing coaxial cable within the premises for distribution of these services by wireless radiation and the modes of distributing this radiation within the premises.

BACKGROUND

Broadband communication systems (e.g., cable systems) provide the capability of delivering various bundles of voice, video, and data services to premises. Once delivered to a premises it must be distributed to various applications within the premises. This often requires added wiring to be routed within the premises at an added expense that may result in some potential customers not accepting such service when offered or in a large expense to the service provider. To provide this added wiring is an expensive and extensive undertaking since the added wiring must traverse the various interior regions of the house is order to connect to the varied devices capable of broadband services.

One method of achieving delivery of broadband services without the undesirable rewiring of the premises may be able to be accomplished by a means of a wireless transmitter. When the transceiver is located inside the structure, no additional wiring is needed, but wireless radiation to various sections of the premises is often impeded by internal structural elements of the premises.

When the wireless transceiver is affixed to an outside wall of the premises, lifeline power can be supplied to the wireless device from the service provider's plant. But by locating the device on the outside of the premises, the outer wall structure becomes an added barrier to adequate radiation to many locations within the premises.

Hence, receiving a signal from a single fixed wireless transmitter, through structure within or without the premises, results in an attenuated signal with inferior signal quality at many internal locations. To overcome the additional attenuation, due to structural impedance, may require the use of an undesirably high transmission level.

SUMMARY OF THE INVENTION

Typically, premises receiving broadband cable services are or need to be internally wired to provide standard broadcast and broadband services to a plurality of devices throughout the premises. By using the existing coaxial cable to distribute services, by localized wireless transmission throughout the premises, a single wireless access node may be used to transport the broadband services via the existing coax cabling. This provides a method for distribution of the broadband services without adding any new dedicated wiring in the premises.

In one exemplary embodiment, an apparatus can include a communication interface and a controller. The communication interface can be configured for receiving broadband signals and for transmitting RF frequency signals to a diplexer located within a premises via cabling. The RF frequency signals can be configured for distribution to signal radiation devices of the premises via the diplexer. The RF frequency signals can be configured for being radiated by the signal radiation devices to at least one wireless device. The controller can be configured for generating packetized signals from the received broadband signals at a first frequency and for modulating the packetized signals at a second frequency. The RF frequency signals can include the modulated packetized signals at the second frequency.

In one exemplary embodiment, an apparatus can include an input device, a wireless device and a first diplexer. The input device can be configured for receiving broadband signals and broadcast signals. The wireless device can be configured for generating packetized signals from the received broadband signals at a first frequency and for modulating the packetized signals at a second frequency. The first diplexer can be configured for providing RF frequency signals to a second diplexer located within a premises via cabling. The RF frequency signals can include the broadcast signals at the first frequency and the modulated packetized signals at the second frequency. At least a portion of the RF frequency signals can be configured for distribution to signal radiation devices of the premises via the diplexer.

In one exemplary embodiment, a communication system can include a first diplexer and a signal radiation device. The first diplexer can be located in a premises for receiving RF frequency signals via cabling connected outside of the premises. The RF frequency signals can include broadcast signals at a first frequency and broadband signals at a second frequency. The signal radiation device can be coupled with the first diplexer for radiating the broadband signals to a wireless device. The broadband signals can have different address headers than Ethernet signals intended for wired distribution.

In one exemplary embodiment, a broadband signal access point (which may be located internally or external to the premises) in combination with the existing cabling is used with some added radiation devices to provide cost effective distribution of broadband services within the premises.

A premises, which is configured to receive broadband services through an existing standard broadcast cable system, is provided with a broadband interface unit (i.e. Set-top box, Broadband Termination Interface, or cable modem) that connects to the in-premises cabling to consumer devices such as a television set, telephone PDAs etc.

Connected to the broadband interface is an adjunct or built-in wireless transceiver. The transceiver transmits broadband data, digitized voice and digital multimedia signals or any other broadband service through the in-premises cable system to an antenna located within the premises. The antenna then wirelessly radiates to the client devices. This system provides broadband data, voice and multimedia signals or any other broadband service to the applications by a wireless signal as distinguished from the signals supplied by the cable and internal wiring that are directly connected to the consumer devices.

The adjunct or built-in device formats the broadband data, multimedia and voice signals into a packet data format then converts it to a RF signal suitable for transmission. The output of the device then is coupled to the in-premises cabling, via a diplexer (i.e., typically at the BT1, cable modem or gateway). At a second or nth convenient location in the in-premises cable, a second diplexer is connected to the cable. The diplexer couples only the RF signal containing the broadband data, multimedia and voice signals (not the standard broadcast services) to a signal radiation device (I.e., an RF antenna or via the signal radiation leaking from a coaxial cable itself) which radiates the signal to the immediate surrounding location. Various application wireless devices, near the radiating cable location, receives the RF signal containing the specific services from the radiating antenna or leaking source. Applications at the second or nth location may radiate application generated signals back through the antenna and diplexer (or filter) for transmission through the in-premises cable to the adjunct device and back to the BT1, cable modem or gateway into the cable system.

DETAILED DESCRIPTION

Figure 1:
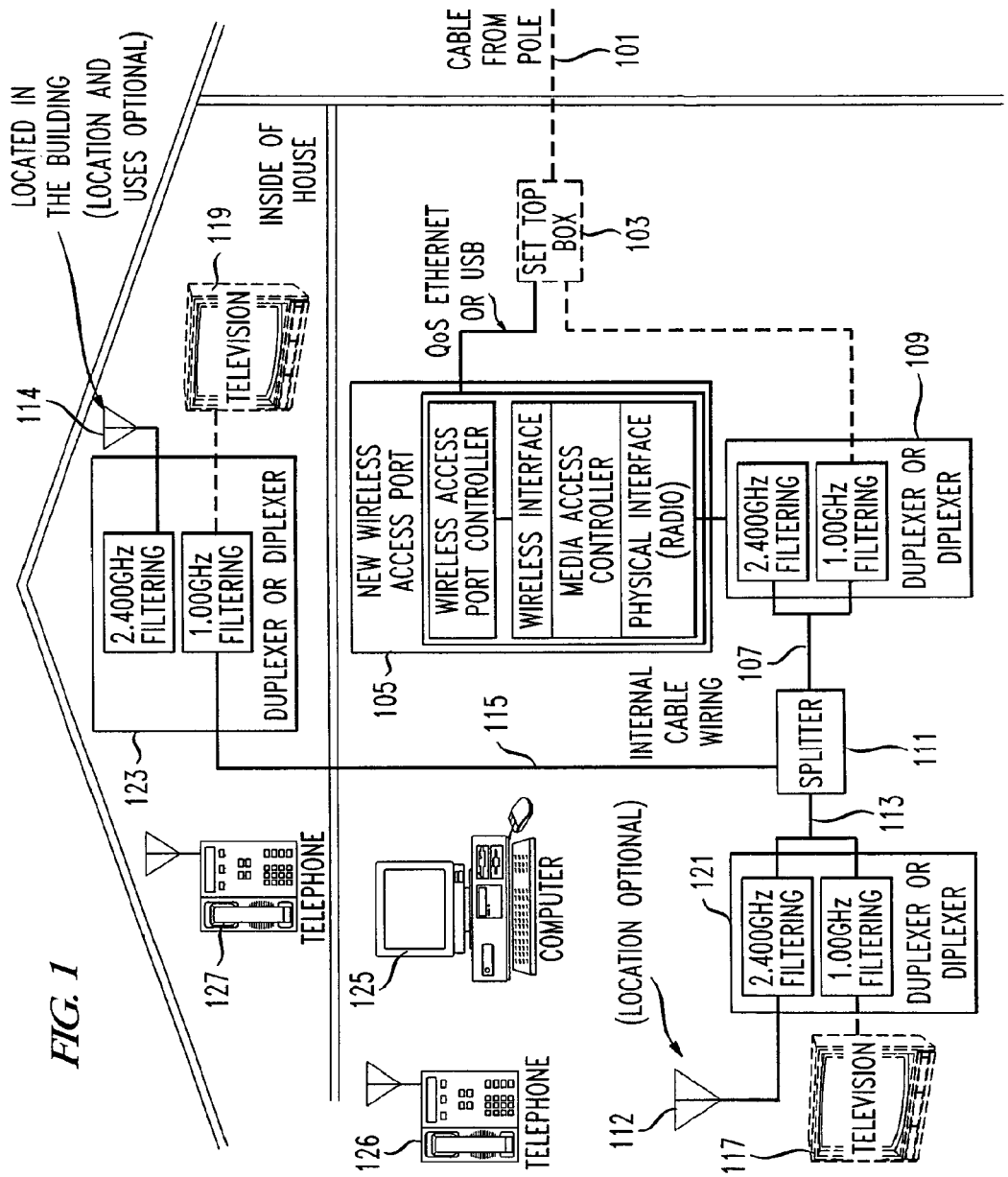
FIG. 1 is a block diagram of an in-premises broadband system for distributing broadband data, multimedia and telephony voice signals from inside the premises.

A typical exemplary broadband distribution architecture for delivery of broadband services in residential premises, as shown in the FIG. 1, receives broadband input, including multimedia, data and voice, via cable link 101. This cable link is shown connected to a set top box 103 within the premises. Device 103 converts the incoming RF frequencies containing the broadband and broadcast signals to the format necessary to accommodate the devices to be serviced within the premises. Set top boxes and cable modems are a well-known item and further discussion of their operation is not believed necessary.

A broadband wireless device 105 is attached to the cable modem section of device 103 via a data access port, which in FIG. 1 is included within the cable modem section of device 103. Such a connection may alternatively comprise a USB (Universal Serial Bus), an Ethernet connection or similar connection port used as a direct connection. The connection port is capable of bi-directional communication with the cable and includes simultaneously connecting services from and to the cable input 101 and includes such services as streaming video, video on demand, voice telephony and other services which may be provided.

In accord with the invention, the wireless device 105 formats the digital broadband data, multimedia and voice signals, that has been converted from the RF signals by device 103, into a packet data format and modulates an RF signal suitable for transmission. In the illustrative embodiment the wireless device 103 has its RF output connected to the internal cable system's coaxial cable 107, via a diplexer 109. Cable 107 is connected to a splitter 111 and is shown in the illustrative embodiment branching into two cable links 113 and 115. Cable 113 is shown connected to a first TV receiver 117 and cable 115 is shown connected to a second TV receiver 119 located in another area of the premises. Diplexer filter or Duplexer filter 121 and 123 are shown connected in series with the cables 113 and 115 respectively just prior to connection to the receivers 117 and 119, respectively. The Diplexer/Duplexer filter isolates the RF frequencies containing the broadband data signals from the RF frequencies containing the broadcast signals at the outputs of the Diplexer/Duplexer filter from the combined cable RF signal complex. Each Diplexer/Duplexer has an RF radiating antenna 112 and 114 for radiating the RF frequencies containing the digitized broadband data signals intended for the wireless devices such as cordless telephones 126, 127 and LAN connected PCs 125.

Figure 2:
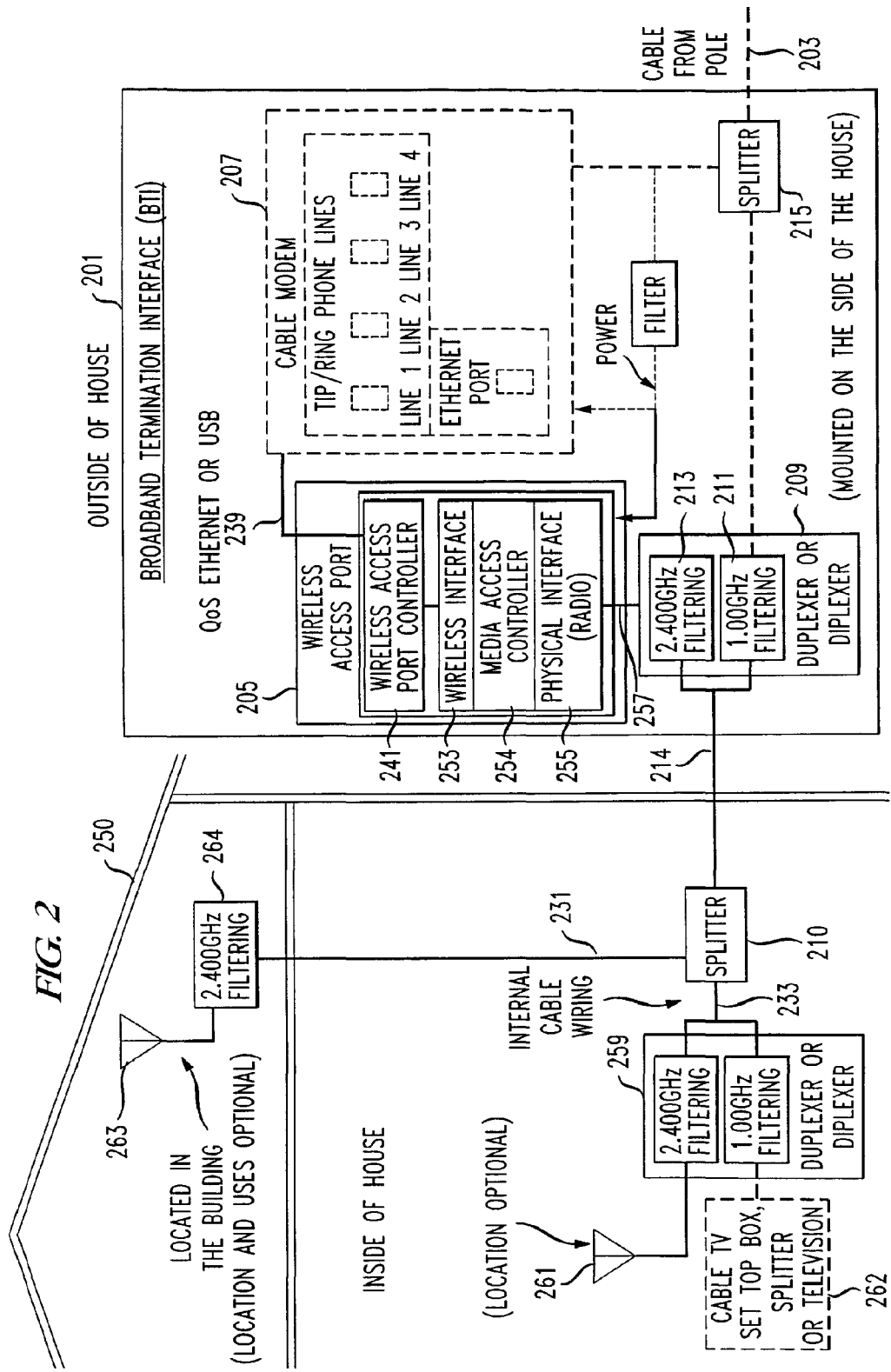
FIG. 2 is a block diagram of an in-premises broadband system for distributing broadband data, multimedia and telephony voice from outside the premises through a broadband termination interface.

Another arrangement for distributing broadband data, multimedia, telephony voice or any broadband services inside the structure 250 uses a Broadband Termination Interface 201 located outside the premises as illustrated in the FIG. 2.

For explanatory purposes illustrative signal frequencies are discussed. No limitation to the scope of the invention is intended beyond the claimed limitations. This arrangement uses a Broadband Termination Interface (BTI) Device 201, normally affixed on an outside wall of the premises, and which is positioned to be conveniently connected to the incoming cable 203. The BTI 201 includes a cable modem 207 as standard equipment and, as shown in FIG. 2, a supplementary wireless access port 205 and diplexer 209, which are included as additions to a standard BTI Diplexer/Duplexer 209 consists of a 1 GHz filter 211 and a 2.4 GHz filter 213 which connects the input from cable 203 and the wireless access port cable 257 through a splitter 210 to cabling (231, etc) located within the premises 250. The Diplexer/Duplexer 209 combines the standard broadcast frequencies and the broadband data frequencies from the wireless access port on to the coax cable 214.

The input cabling 203, which carries RF frequencies that consist of a combination of analog TV broadcast signals, voice analog signals and digital data signals, is connected to the cable modem section 207 of the BTI 201 and the diplexer through the splitter 215. Normal broadcast signals intended for wired delivery within the premises are applied to the 1 GHz filter section of the Diplexer/Duplexer 209 which couples these signals to cabling 231, 233 within the premises.

Cable modem 207 converts input analog radio frequency signals carrying the broadband services to digital signals of Ethernet or USB compatible format having different address headers than Ethernet signals intended for wired distribution within the premises. The modem applies these digital signals to the wireless access port 205 on lead 239. The lead 209 is connected to the wireless access port controller section 241 which converts the Ethernet format packets to data streams that are readable by the Media Access Controller (MAC) in the wireless access port. The wireless access port controller is coupled to the Wireless Interface 253 to the media access controller (MAC) 254 which supplies the appropriate headers to data packets supplied to the radio interface 255. The output of the radio section 255 is lead 257 (i.e., coax cable) which corresponds to a point at which the conventional output is an antenna, however the output lead 257 is connected to the input of the Diplexer/Duplexers 209 2.4 GHz filter section. The filtered radio output is distributed to antennas 261 and 263 located within the premises via internal coaxial cabling 231, 233 originally intended for cable TV reception. Cable 233 is connected to a diplexer 259, which supplies signals to a set top box and to antenna 262. Cable 231 is directly connected to antenna 263 by way of a 2.4 GHz filter 264.

A further radiation distribution technique may take advantage of a leaky cable that radiates the broadband signals along the cable length. This may be explicitly exploited by use of leaky cables to service intermediately located wireless applications. Use of cables as a radiative/antenna device is a well-known technique and an extended discussion is not believed necessary.

The wireless broadband signals are distributed by wireless radiation to the wireless receivers within the premises. In a conventional wireless distribution using one BTI the perimeter and in-building construction features include many metallic barriers requiring significant radiative power to penetrate. By distributing the wireless radiation sources, the necessary RF output levels to cover the entire premises is greatly reduced. These distributed radiation devices also act as distributed receptors for picking up return radio signals. This greatly enhances broad band reception and transmission within the premises.

While the exemplary embodiment discloses delivery of broadband via external 10 cable (101, 203), it is to be understood that alternate delivery apparatus and methods are also included. One type of broadband delivery contemplated is by fixed wireless where a wireless receiver is used instead of the external cable input. Another delivery system contemplated is DSL (digital subscriber line) in place of the external cable input. Many further variations will suggest themselves to those skilled in the art, which do not depart from the spirit and scope of the invention.

The invention claimed is:

1. An apparatus comprising:
a communication interface that is operable for receiving broadband signals and for transmitting radio frequency signals to a diplexer located within a premises via cabling, wherein the radio frequency signals are configured for distribution to signal radiation devices of the premises via the diplexer, and wherein the radio frequency signals are configured for being radiated by the signal radiation devices to at least one wireless device; and
a controller that is operable for:
converting input analog radio frequency signals carrying the broadband signals to digital Ethernet signals, wherein the digital Ethernet signals have different address headers than other Ethernet signals intended for wired distribution;
generating packetized signals from the received broadband signals at a first frequency; and
modulating the packetized signals at a second frequency, wherein the radio frequency signals comprise the modulated packetized signals at the second frequency.

2. The apparatus of claim 1, wherein the communication interface is operable for receiving broadcast signals, and wherein the radio frequency signals comprise the broadcast signals at the first frequency.

3. The apparatus of claim 2, wherein the controller comprises another diplexer for combining the broadcast signals at the first frequency and the modulated packetized signals at the second frequency.

4. The apparatus of claim 1, wherein at least a portion of the radio frequency signals are configured to enable voice communications utilizing the at least one wireless devices.

5. The apparatus of claim 1, wherein the radio frequency signals comprise television broadcast signals and voice analog signals.

6. The apparatus of claim 1, wherein the controller comprises a media access controller that is programmed for providing the address headers to data packets of the digital Ethernet signals.

7. The apparatus of claim 1, wherein the other diplexer comprises a first filter operating at 2.4 GHz and a second filter operating at 1.0 GHz.

8. An apparatus comprising:
a communication interface that is operable for:
receiving broadband signals and broadcast signals; and
transmitting radio frequency signals to a first diplexer located within a premises via cabling, wherein the radio frequency signals are configured for distribution to signal radiation devices of the premises via the first diplexer, and wherein the radio frequency signals are configured for being radiated by the signal radiation devices to at least one wireless device; and
a controller comprising a cable modem and a second diplexer, wherein the controller is operable for generating packetized signals from the received broadband signals at a first frequency and for modulating the packetized signals at a second frequency, wherein the radio frequency signals comprise the modulated packetized signals at the second frequency,
wherein the cable modem is operable for converting input analog radio frequency signals carrying the broadband signals to digital Ethernet signals, wherein the digital Ethernet signals have different address headers than other Ethernet signals intended for wired distribution, and wherein the broadcast signals bypass the cable modem to be combined with the modulated packetized signals by the second diplexer.

9. The apparatus of claim 8, wherein the second diplexer comprises a first filter operating at 2.4 GHz and a second filter operating at 1.0 GHz.

10. The apparatus of claim 8, wherein at least a portion of the radio frequency signals are configured to enable voice communications utilizing the at least one wireless devices.

11. The apparatus of claim 8, wherein the radio frequency signals comprise television broadcast signals and voice analog signals.

12. The apparatus of claim 8, wherein the controller comprises a media access controller that is programmed for providing the address headers to data packets of the digital Ethernet signals.

13. An apparatus comprising:
a communication interface that is operable for receiving broadband signals and for transmitting radio frequency signals into a premises via cabling for distribution to signal radiation devices of the premises, and wherein the radio frequency signals are configured for being radiated by the signal radiation devices to at least one wireless device; and
a controller that is operable for:
converting input analog radio frequency signals carrying the broadband signals to digital Ethernet signals, wherein the digital Ethernet signals have different address headers than other Ethernet signals intended for wired distribution; and
modulating packetized signals, wherein the radio frequency signals comprise the modulated packetized signals.

14. The apparatus of claim 13, wherein the controller comprises a diplexer, and wherein broadcast signals are combined with the modulated packetized signals by the diplexer.

15. The apparatus of claim 13, wherein at least a portion of the radio frequency signals are configured to enable voice communications utilizing the at least one wireless devices.

16. The apparatus of claim 15, wherein the controller comprises a diplexer, and wherein broadcast signals combined with the modulated packetized signals by the diplexer.

17. The apparatus of claim 13, wherein the radio frequency signals comprise television broadcast signals and voice analog signals.

18. The apparatus of claim 17, wherein the controller comprises a diplexer, and wherein the television broadcast signals are combined with the modulated packetized signals by the diplexer.

19. The apparatus of claim 13, wherein the controller comprises a media access controller that is programmed for providing the address headers to data packets of the digital Ethernet signals.

20. The apparatus of claim 19, wherein the controller comprises a diplexer, and wherein broadcast signals are received and combined with the modulated packetized signals by the diplexer.

* * * * *